A. FICKETT,
APPARATUS FOR SEPARATING WOOD FIBER FOR PAPER.

No. 102,239.  Patented Apr. 26, 1870.

Witnesses:
F. H. Clement.
Ira Loughborough

Inventor:
Albert Fickett

United States Patent Office.

ALBERT FICKETT, OF ROCHESTER, NEW YORK, ASSIGNOR TO HIMSELF, ISAAC BUTTS, AND CHARLES T. MOORE, OF SAME PLACE.

Letters Patent No. 102,239, dated April 26, 1870.

IMPROVEMENT IN APPARATUS FOR SEPARATING WOOD FIBER FOR PAPER, &c.

The Schedule referred to in these Letters Patent and making part of the same.

*To all whom it may concern:*

Be it known that I, ALBERT FICKETT, of Rochester, in the county of Monroe and State of New York, have invented a new and useful Apparatus for Separating Wood-Fiber; and I do hereby declare that the following is a full, clear, and exact description thereof, reference being had to the accompanying drawings making part of this specification, in which—

The object of my invention, the nature of which will be understood by reference to the specification and drawings, is more particularly to provide an apparatus for more perfectly separating woody fiber after having been subjected to longitudinal pressure, as described in my patent of June 29, 1869.

To enable others to make and use my invention, I will describe its construction and operation.

The toothed cylinder B has bearings upon the frame A, and is driven at a suitable speed by any convenient arrangement of belts or gearing.

A case, C, surrounds the cylinder, and to its upper side the hopper H is attached, to receive the stock and convey it to the apparatus.

The teeth of the cylinder B, which is constructed of cast iron, or other suitable metal, are formed by cutting V-shaped grooves in its periphery in the line of rotation, and others across these in the line of its axis, leaving small pyramidal projections, as shown.

Figure 1:
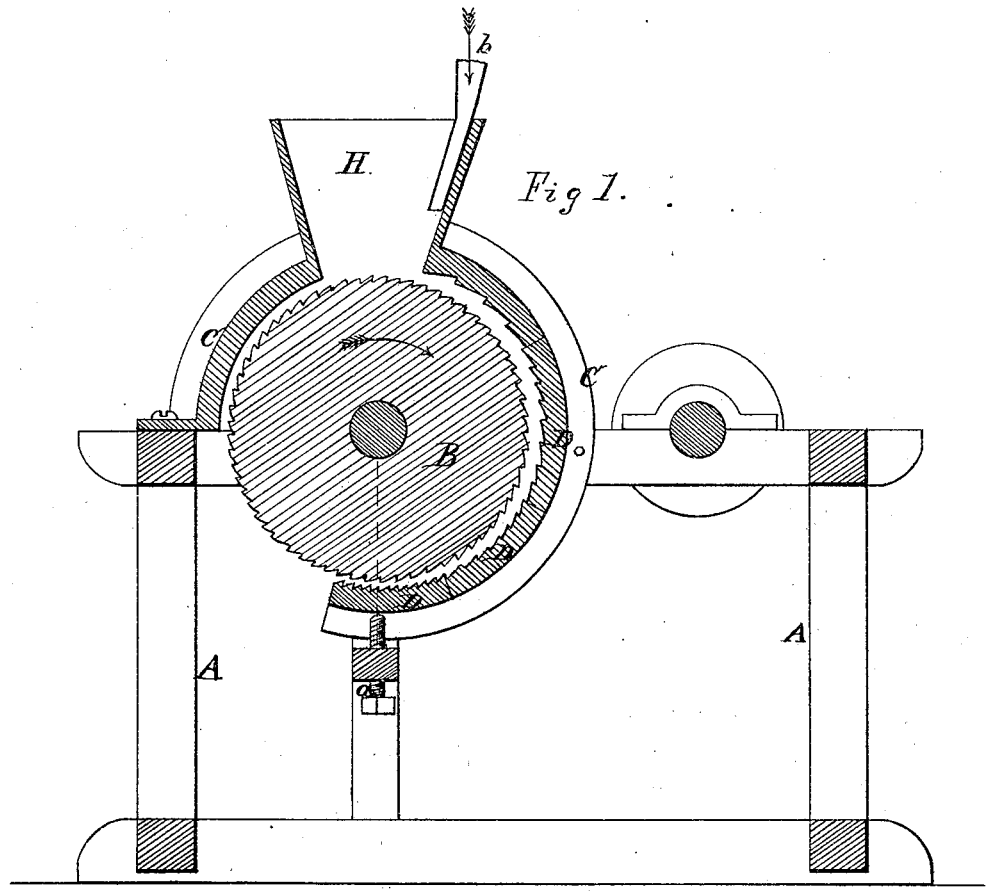
Figure 1 is a vertical section of my invention.

It is found advantageous to incline these teeth forward in the direction of motion, having the working-edge nearly or quite perpendicular, as shown in fig. 1.

Figure 2:
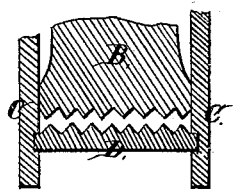
Figure 2 is a transverse section of a portion of the cylinder and concave.

Upon one side of the case C, I provide the toothed concave D, which is held in circular grooves in the sides of the case, as shown in fig. 2, and between which and the cylinder B the stock passes from the hopper. This concave may extend as far as desirable around the cylinder B, and, as will be seen by reference to fig. 1, it is not located concentrically to said cylinder, but is nearest to it at the point of exit of the stock.

The concave is also made in several sections, and the teeth in each section are made finer than those in the preceding one, as shown in fig. 1, or they may be made of gradually increasing fineness from the entrance to the exit.

The object of this arrangement is to allow large fragments of the crushed stock to enter readily, and be gradually disintregated as they pass through. The teeth in the concave are similar in form to those in the cylinder, except that they are inclined in an opposite direction, whereby they hold the stock while the teeth in the cylinder grate off and separate the fiber.

It is found desirable to have a stream of water enter the hopper H with the stock through a flat spout, $b$, fig. 1, which greatly assists in the disintegration of the stock, and in cleaning the teeth of the apparatus.

The case C is attached in any convenient manner to the frame A, so as to be slightly adjustable in relation to the cylinder at the point of exit of the stock, by means of a set-screw, $a$.

It is proposed in practice to use two or more of these devices, the second so located as to receive stock from the first, and so on, the teeth in the cylinders or concaves, or both, increasing in fineness in each succeeding apparatus. By this means the stock which has been bruised and crushed previously, as described in my former patent, is completely reduced to a fine pulpy mass ready for the beating engine proper.

The teeth in the cylinder B, instead of being exactly in the line of rotation, may be made in spiral rows, by cutting a thread on the periphery of the cylinder, and if desirable, the teeth in the concave may be similarly located.

I do not confine myself to the precise shape of the teeth herein described, since other forms may be used to advantage.

What I claim as my invention, and desire to secure by Letters Patent, is—

1. The toothed cylinder B, in combination with the eccentrically located concave D, when the teeth in each are inclined in an opposite direction, substantially as and for the purposes set forth.

2. The sectional concave D, provided with teeth of gradually increasing fineness, as and for the purposes set forth.

3. The within-described pulping-apparatus, consisting of toothed cylinder B, and eccentrically located concave D, when used in connection with any device for separating wood fiber by longitudinal pressure, for the purposes specified

ALBERT FICKETT.

Witnesses:
F. H. CLEMENT,
GEO. T. PARKER.